US011733413B2

United States Patent
Liu et al.

(10) Patent No.: US 11,733,413 B2
(45) Date of Patent: Aug. 22, 2023

(54) METHOD AND SYSTEM FOR SUPER RESOLUTION LEAST-SQUARES REVERSE TIME MIGRATION

(71) Applicant: SAUDI ARABIAN OIL COMPANY, Dhahran (SA)

(72) Inventors: Hongwei Liu, Dhahran (SA); Yi Luo, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 167 days.

(21) Appl. No.: 17/245,579

(22) Filed: Apr. 30, 2021

(65) Prior Publication Data

US 2022/0350042 A1  Nov. 3, 2022

(51) Int. Cl.
*G01V 1/30* (2006.01)
*E21B 47/003* (2012.01)
(Continued)

(52) U.S. Cl.
CPC .............. *G01V 1/30* (2013.01); *E21B 47/003* (2020.05); *E21B 47/0025* (2020.05);
(Continued)

(58) Field of Classification Search
CPC .. G01V 1/30; G01V 1/282; G01V 2210/1234; G01V 2210/51
See application file for complete search history.

(56) References Cited

U.S. PATENT DOCUMENTS 9,964,655 B2 * 5/2018 Caprioli ................. G01V 1/282
10,436,927 B2 * 10/2019 Sun ........................ G01V 1/364
(Continued)

FOREIGN PATENT DOCUMENTS

CN   108333628 A   7/2018
CN   108828657 A   11/2018
(Continued)

OTHER PUBLICATIONS

C. Li, J. Gao, Z. Gao, R. Wang and T. Yang, Nov. 25, 2020 "Reflection Angle-Domain Pseudoextended Least-Squares Reverse Time Migration Using Hybrid Regularization," in IEEE Transactions on Geoscience and Remote Sensing, vol. 59, No. 12, pp. 10671-10684. (Year: 2020).*

(Continued)

*Primary Examiner* — Manuel A Rivera Vargas
*Assistant Examiner* — Yaritza H Perez Bermudez
(74) *Attorney, Agent, or Firm* — Osha Bergman Watanabe & Burton LLP

(57) ABSTRACT

A method may include obtaining seismic data regarding a geological region of interest. The method may further include obtaining a property model regarding the geological region of interest. The method may further include determining an adjoint migration operator based on the property model. The method may further include updating the property model using the seismic data and a conjugate gradient solver in a least-squares reverse time migration to produce a first updated property model. The conjugate gradient solver is based on the adjoint migration operator. The method may further include updating the first updated property model using a threshold shrinkage function to produce a second updated property model. The threshold shrinkage function comprises a sign function and a maximum function that are applied to the first updated property model. The method may further include generating a seismic image of the geological region of interest using the second updated property model.

18 Claims, 9 Drawing Sheets

(51) Int. Cl.
*E21B 47/002* (2012.01)
*G01V 1/28* (2006.01)

(52) U.S. Cl.
CPC ...... *G01V 1/282* (2013.01); *G01V 2210/1234* (2013.01); *G01V 2210/51* (2013.01)

(56) References Cited

U.S. PATENT DOCUMENTS

| | | | |
|---|---|---|---|
| 10,677,949 B2* | 6/2020 | Yu | G01V 1/364 |
| 10,725,190 B2* | 7/2020 | Gratacos | G01V 1/364 |
| 10,788,597 B2* | 9/2020 | Kim | G01V 1/375 |
| 2017/0248716 A1* | 8/2017 | Poole | G01V 1/32 |
| 2019/0302293 A1* | 10/2019 | Zhang | G01V 1/303 |
| 2020/0210846 A1* | 7/2020 | Yu | G01V 1/282 |
| 2020/0348430 A1* | 11/2020 | Tan | G01V 1/303 |
| 2022/0357474 A1* | 11/2022 | Bai | G01V 1/282 |

FOREIGN PATENT DOCUMENTS

| | | |
|---|---|---|
| CN | 110687600 B | 5/2020 |
| CN | 110133713 B | 8/2020 |
| CN | 109946741 B | 9/2020 |
| CN | 112130199 A | 12/2020 |
| WO | 2016-005815 A2 | 1/2016 |

OTHER PUBLICATIONS

U. Albertin et al: "Adjoint wave-equation velocity analysis" SEG/New Orleans 2006 Annual Meeting (2006), pp. 3345-3349 (5 pages).

Zhiguang Xue et al. "Imaging incomplete data and simultaneous-source data using least-squares reverse-time migration with shaping regularization" SEG Denver 2014 Annual Meeting (2014), pp. 3991-3996, DOI: http://dx.doi.org/10.1190/segam2014-1552.1 (7 pages).

Di Wu et al. "Least-squares RTM with L1 norm regularization" SEG International Exposition and 86th Annual Meeting (2016), pp. 4210-4214 (6 pages).

Hongwei Liu et al. "Reverse time adjoint migration" Society of Exploration Geophysicists, Geophysics, vol. 84, No. 3 (May-Jun. 2019); p. R401-R410 (10 pages).

* cited by examiner

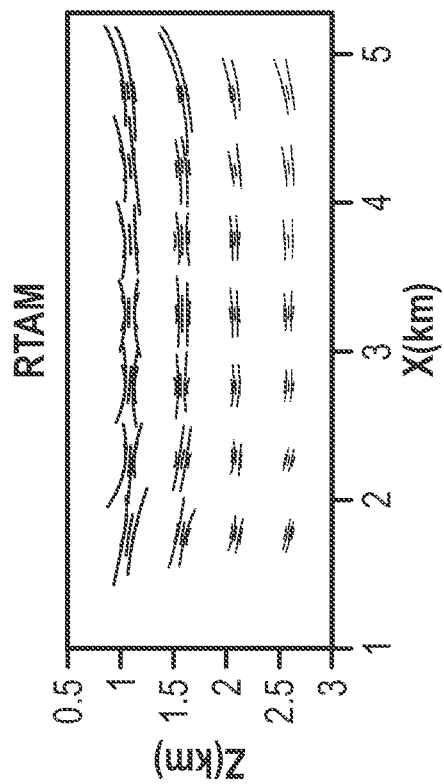
FIG. 5B RTAM
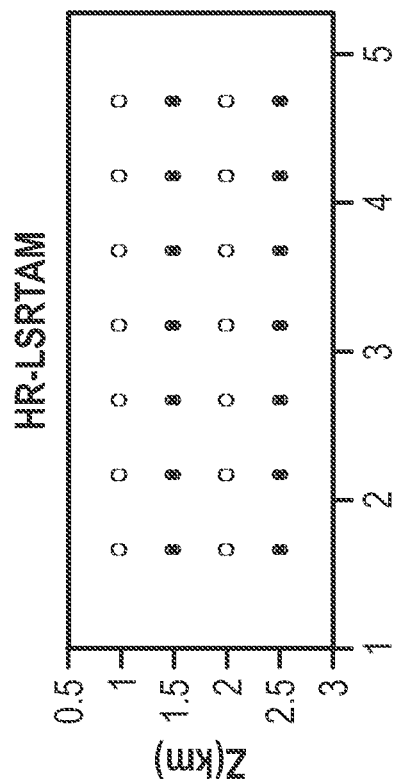
FIG. 5D HR-LSRTAM
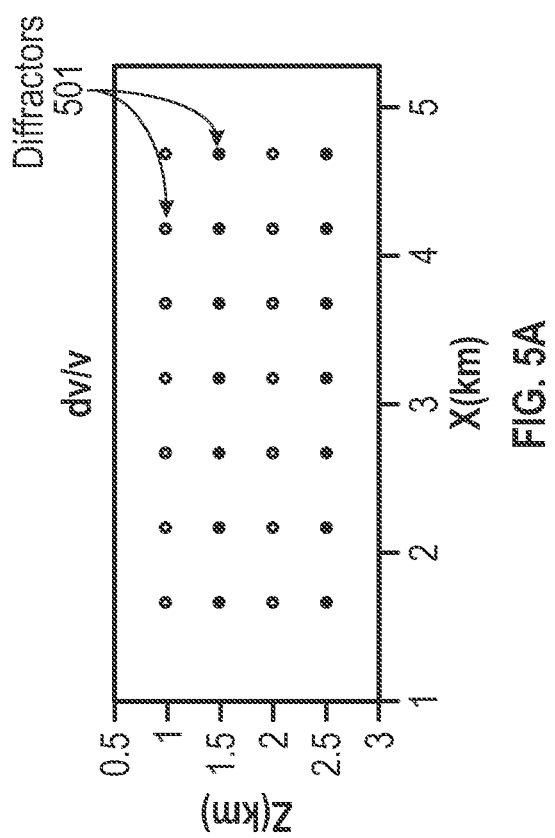
FIG. 5A dv/v Diffractors 501
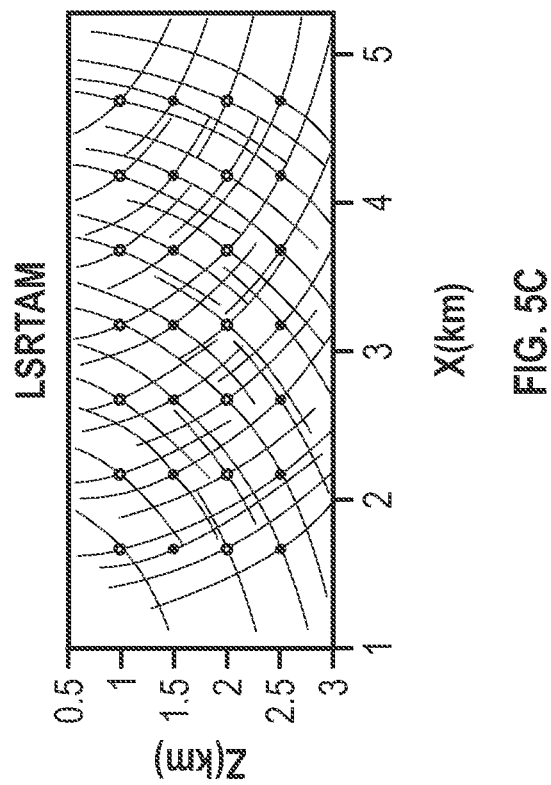
FIG. 5C LSRTAM

METHOD AND SYSTEM FOR SUPER RESOLUTION LEAST-SQUARES REVERSE TIME MIGRATION

BACKGROUND

By performing a complete migration-wavefield inversion, a migration algorithm may convert time-based seismic data into a depth representation of a subsurface. In particular, a migration algorithm may use a velocity model that represents different particle velocity values within the subsurface to determine image data from data in a data domain. However, migration algorithms may be computational intensive processes due to the required number of iterations.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method that includes obtaining, by the computer processor, seismic data regarding a geological region of interest. The method further includes obtaining, by the computer processor, a property model regarding the geological region of interest. The method further includes determining, by the computer processor, an adjoint migration operator based on the property model. The method further includes updating, by the computer processor, the property model using the seismic data and a conjugate gradient solver in a least-squares reverse time migration to produce a first updated property model. The conjugate gradient solver is based on the adjoint migration operator. The method further includes updating, by the computer processor, the first updated property model using a threshold shrinkage function to produce a second updated property model. The threshold shrinkage function includes a sign function and a maximum function that are applied to the first updated property model. The method further includes generating, by a computer processor, a seismic image of the geological region of interest using the second updated property model.

In general, in one aspect, embodiments relate to a system that includes a seismic surveying system that includes a seismic source and a plurality of seismic receivers. The system further includes a seismic interpreter including a computer processor. The seismic interpreter is coupled to the seismic surveying system. The seismic interpreter obtains seismic data regarding a geological region of interest. The seismic interpreter obtains a property model regarding the geological region of interest. The seismic interpreter determines an adjoint migration operator based on the property model. The seismic interpreter updates the property model using the seismic data and a conjugate gradient solver in a least-squares reverse time migration to produce a first updated property model. The conjugate gradient solver is based on the adjoint migration operator. The seismic interpreter updates the first updated property model using a threshold shrinkage function to produce a second updated property model. The threshold shrinkage function includes a sign function and a maximum function that are applied to the first updated property model. The seismic interpreter generates a seismic image of the geological region of interest using the second updated property model.

In general, in one aspect, embodiments relate to a non-transitory computer readable medium storing instructions executable by a computer processor. The instructions include obtaining seismic data regarding a geological region of interest. The instructions further include obtaining a property model regarding the geological region of interest. The instructions further include determining an adjoint migration operator based on the property model. The instructions further include updating the property model using the seismic data and a conjugate gradient solver in a least-squares reverse time migration to produce a first updated property model. The conjugate gradient solver is based on the adjoint migration operator. The instructions further include updating the first updated property model using a threshold shrinkage function to produce a second updated property model. The threshold shrinkage function includes a sign function and a maximum function that are applied to the first updated property model. The instructions further include generating a seismic image of the geological region of interest using the second updated property model.

In some embodiments, the property model is updated iteratively until an objective function corresponding to a difference between predicted data and acquired data converges to a predetermined criterion. In some embodiments, the conjugate gradient solver determines a residual value based on an output of the threshold shrinkage function. The first updated property model is updated based on the residual value. In some embodiments, the threshold shrinkage function is based on an L1 norm constraint. In some embodiments, the adjoint migration operator is symmetric with a forward migration operator. The adjoint migration operator is based on a Born approximation for acoustic waves. In some embodiments, a velocity model is obtained regarding the geological region of interest. The property model is a reflection model. The property model is updated using the velocity model. In some embodiments, a method includes determining, using the computer processor, a presence of hydrocarbons in the geological region of interest using the seismic image. In some embodiments, the method further includes acquiring, using a seismic surveying system, the seismic data regarding the geological region of interest. The method further includes generating the velocity model using the seismic data and a seismic inversion operation. Other aspects of the disclosure will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

FIGS. 5A, 5B, 5C, and 5D show examples in accordance with one or more embodiments.

DETAILED DESCRIPTION

Figure 1:
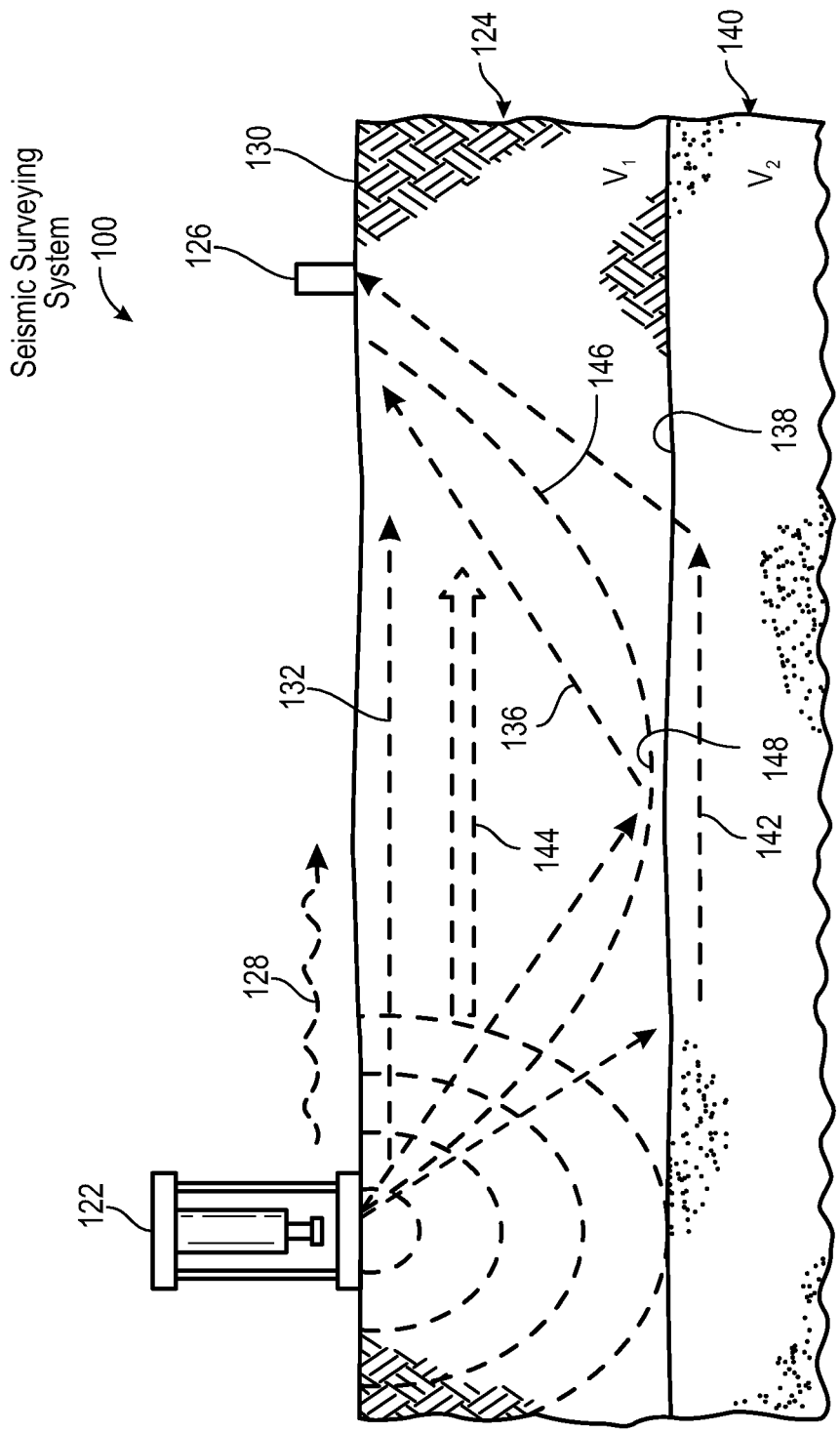
FIGS. 1 and 2 show systems in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include systems and methods for performing a least-squares reverse time migration using a threshold shrinkage function. For example, a least-squares reverse time migration may use an objective function based on the difference of predicted data obtained using a migration function and acquired seismic data in order to solve a least-squares optimization problem. However, there are several difficult migration problems to obtaining a high resolution image. For example, a property model (e.g., a velocity model or a reflection model) of a geological region may be blurred by random noise, migration artifacts, and various unwanted signals due to subsurface complexity and seismic acquisition limitations. As another example, a particular least-squares reverse time migration algorithm may have a slow convergence. As such, some embodiments address these problems by applying a threshold shrinkage function within a least-squares reverse time migration algorithm. In particular, a threshold shrinkage function may include a sign function and a maximum function that are applied to update a property model.

Furthermore, some embodiments include a least-squares reverse time migration algorithm that uses an adjoint migration operator based on a forward migration operator (i.e., in the context of forward modeling seismic data) and a Born approximation for acoustic wave equations. For example, the adjoint migration operator may be an adjoint of the forward migration operator. By using an adjoint migration operator, a conjugate gradient solver may be used in a least-squares reverse time migration algorithm. In other words, matrix multiplication by a forward migration operator with an adjoint migration operator may be symmetric, thus allowing for use of a conjugate gradient solver. In contrast, where the migration operator matrixes are asymmetric, a regular gradient solver may be used with a line search method.

Turning to FIG. 1, FIG. 1 shows a schematic diagram in accordance with one or more embodiments. As shown in FIG. 1, FIG. 1 illustrates a seismic surveying system (100) and various resultant paths of pressure waves (also called seismic waves). The seismic surveying system (100) includes a seismic source (122) that includes functionality for generating pressure waves, such as a reflected wave (136), diving wave A (142), or diving wave B (146), through a subsurface layer (124). Pressure waves generated by the seismic source (122) may travel along several paths through a subsurface layer (124) at a particle velocity $V_1$ for detection at a number of seismic receivers (126) along the line of profile. Likewise, particle velocity may refer to multiple velocities types, such as the two types of particle motions resulting from a seismic wave, i.e., velocity of the primary wave (P-wave) and a different velocity of the secondary wave (S-wave) through a particular medium. The seismic source (122) may be a seismic vibrator, such as one that uses a vibroseis technique, an air gun in the case of offshore seismic surveying, explosives, etc. The seismic receivers (126) may include geophones, hydrophones, accelerometers, and other sensing devices. Likewise, seismic receivers (126) may include single component sensors and/or multi-component sensors that measure pressure waves in multiple spatial axes.

As shown in FIG. 1, the seismic source (122) generates an air wave (128) formed by a portion of the emitted seismic energy, which travels above the earth's surface (130) to the seismic receivers (126). The seismic source (122) may also emit surface waves (132), which travel along the earth's surface (130). The speed of the surface waves (132), also called Rayleigh waves or ground roll, may correspond to a particle velocity typically slower than the velocity of a secondary wave. While the seismic surveying shown in FIG. 1 is a two-dimensional survey along a seismic profile along a longitudinal direction, other embodiments are contemplated, such as three-dimensional surveys.

Furthermore, subsurface layer (124) has a particle velocity $V_1$, while subsurface layer (140) has a particle velocity $V_2$. In words, different subsurface layers may correspond to different particle velocity values. In particular, a particle velocity may refer to the speed that a pressure wave travels through a medium, e.g., diving wave B (146) that makes a curvilinear ray path (148) through subsurface layer (124). Particle velocity may depend on a particular medium's density and elasticity as well as various wave properties, such as the frequency of an emitted pressure wave. Where a particle velocity differs between two subsurface layers, this seismic impedance mismatch may result in a seismic reflection of a pressure wave. For example, FIG. 1 shows a pressure wave transmitted downwardly from the seismic source (122) to a subsurface interface (138), which becomes a reflected wave (136) transmitted upwardly in response to the seismic reflection. The seismic source (122) may also generate a direct wave (144) that travels directly from the seismic source (122) at the particle velocity $V_1$ through the subsurface layer (124) to the seismic receivers (126).

Turning to refracted pressure waves, the seismic source (122) may also generate a refracted wave (i.e., diving wave A (142)) that is refracted at the subsurface interface (138) and travels along the subsurface interface (138) for some distance as shown in FIG. 1 until traveling upwardly to the seismic receivers (126). As such, refracted pressure waves may include diving waves (e.g., diving wave A (142), diving wave B (146)) that may be analyzed to map the subsurface layers (124, 140). For example, a diving wave may be a type of refracted wave that is continuously refracted throughout an earth's subsurface. Thus, a diving wave may be generated where particle velocities are gradually increasing with depth at a gradient. Likewise, the apex of a diving wave may be offset from a common midpoint (CMP) in contrast to reflected seismic energy. Though, for analysis purposes, an apex of a diving wave may be regarded as a common midpoint for the refracted energy. As such, the apex may serve as the basis for organizing and sorting a seismic survey dataset.

Furthermore, in analyzing seismic data acquired using the seismic surveying system (100), seismic wave propagation may be approximated using rays. For example, reflected waves (e.g., reflected wave (136)) and diving waves (e.g., diving waves (142, 146)) may be scattered at the subsurface interface (138). In FIG. 1, for example, the diving wave B (146) may exhibit a ray path of a wide angle that resembles a reflected wave in order to map the subsurface. Using diving waves, for example, a velocity model for an underlying subsurface may be generated that describes the particle velocity of different regions in different subsurface layers. An initial velocity model may be generated by modeling the velocity structure of media in the subsurface using an inversion of seismic data, typically referred to as seismic inversion. In seismic inversion, a velocity model is iteratively updated until the velocity model and the seismic data have a minimal amount of mismatch, e.g., the solution of the velocity model converges to a global optimum that satisfies a predetermined criterion.

With respect to velocity models, a velocity model may map various subsurface layers based on particle velocities in different layer sub-regions (e.g., P-wave velocity, S-wave velocity, and various anisotropic effects in the sub-region). For example, a velocity model may be used with P-wave and S-wave arrival times and arrival directions to locate seismic events. Anisotropy effects may correspond to subsurface properties that cause pressure waves to be directionally dependent. Thus, seismic anisotropy may correspond to various parameters in geophysics that refers to variations of wave velocities based on direction of propagation. One or more anisotropic algorithms may be performed to determine anisotropic effects, such as an anisotropic ray-tracing location algorithm or algorithms that use deviated-well sonic logs, vertical seismic profiles (VSPs), and core measurements. Likewise, a velocity model may include various velocity boundaries that define regions where rock types change, such as interfaces between different subsurface layers. In some embodiments, a velocity model is updated using one or more tomographic updates to adjust the velocity boundaries in the velocity model.

Figure 2:
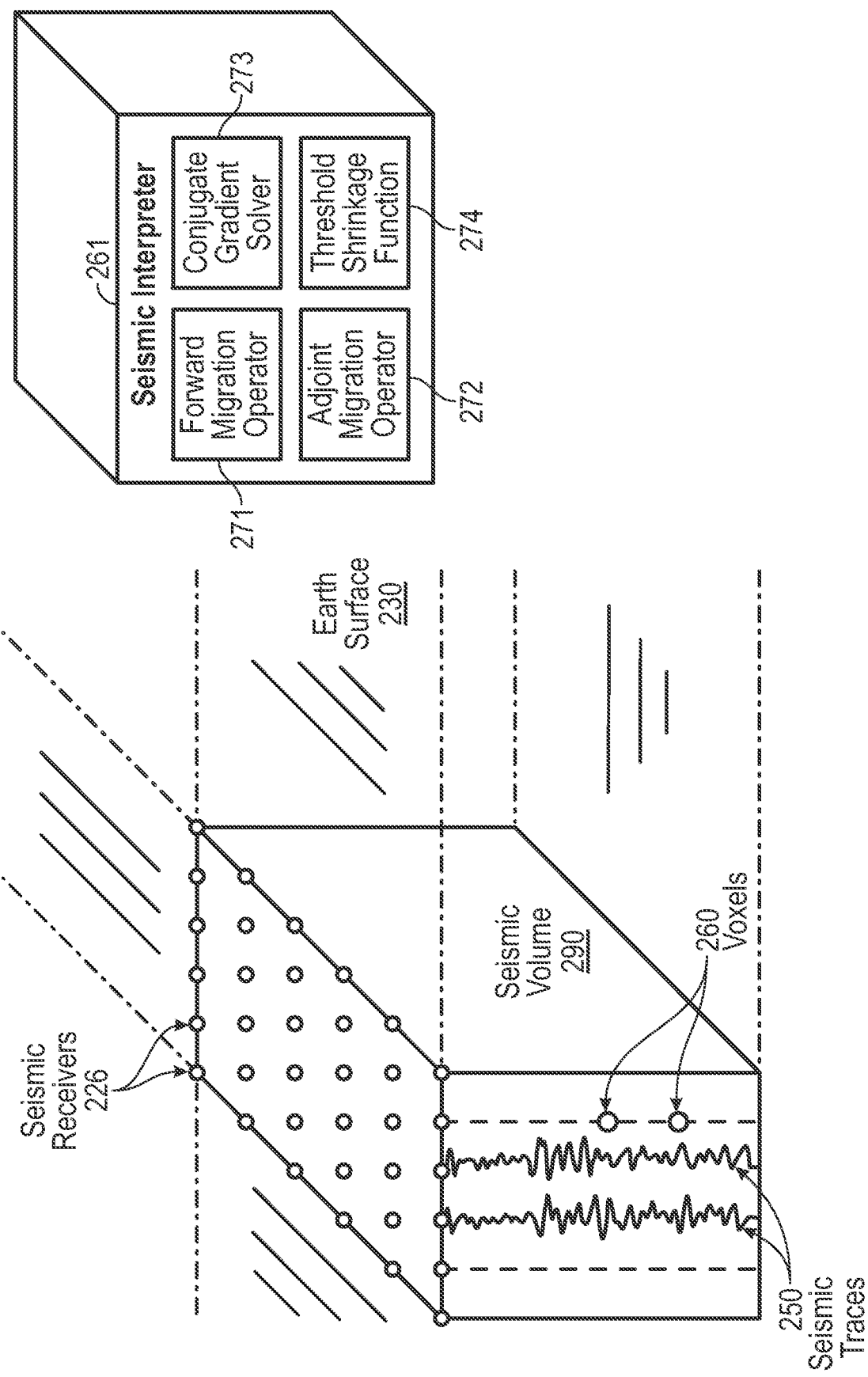

Turning to FIG. 2, FIG. 2 illustrates a system in accordance with one or more embodiments. As shown in FIG. 2, a seismic volume (290) is illustrated that includes various seismic traces (e.g., seismic traces (250)) acquired by various seismic receivers (e.g., seismic receivers (226)) disposed on the earth's surface (230). More specifically, a seismic volume (290) may be a three-dimensional cubic dataset of seismic traces. Individual cubic cells within the seismic volume (290) may be referred to as voxels or volumetric pixels (e.g., voxels (260)). In particular, different portions of a seismic trace may correspond to various depth points within a volume of earth. To generate the seismic volume (290), a three-dimensional array of seismic receivers (226) are disposed along the earth's surface (230) and acquire seismic data in response to various pressure waves emitted by seismic sources. Within the voxels (260), statistics may be determined on first break data that is assigned to a particular voxel to determine multimodal distributions of wave travel times and derive travel time estimates (e.g., according to mean, median, mode, standard deviation, kurtosis, and other suitable statistical accuracy analytical measures) related to azimuthal sectors. First break data may describe the onset arrival of refracted waves or diving waves at the seismic receivers (226) as produced by a particular seismic source signal generation.

Seismic data may refer to raw time domain data acquired from a seismic survey (e.g., acquired seismic data may result in the seismic volume (290)). However, seismic data may also refer to data acquired over different periods of time, such as in cases where seismic surveys are repeated to obtain time-lapse data. Seismic data may also refer to various seismic attributes derived in response to processing acquired seismic data. Furthermore, in some contexts, seismic data may also refer to depth data or image data. Likewise, seismic data may also refer to processed data, e.g., using a seismic inversion operation, to generate a velocity model of a subterranean formation, or a migrated seismic image of a rock formation within the earth's surface. Seismic data may also be pre-processed data, e.g., arranging time domain data within a two-dimensional shot gather.

Furthermore, seismic data may include various spatial coordinates, such as (x,y) coordinates for individual shots and (x,y) coordinates for individual receivers. As such, seismic data may be grouped into common shot or common receiver gathers. In some embodiments, seismic data is grouped based on a common domain, such as common midpoint (i.e., Xmidpoint=(Xshot+Xrec)/2, where Xshot corresponds to a position of a shot point and Xrec corresponds to a position of a seismic receiver) and common offset (i.e., Xoffset=Xshot−Xrec).

In some embodiments, seismic data is processed to generate one or more seismic images. For example, seismic imaging may be performed using a process called migration. In some embodiments, migration may transform pre-processed shot gathers from a data domain to an image domain that corresponds to depth data. In the data domain, seismic events in a shot gather may represent seismic events in the subsurface that were recorded in a field survey. In the image domain, seismic events in a migrated shot gather may represent geological interfaces in the subsurface. Likewise, various types of migration algorithms may be used in seismic imaging. For example, one type of migration algorithm corresponds to reverse time migration. In reverse time migration, seismic gathers may be analyzed by: 1) forward modelling of a seismic wavefield via mathematical modelling starting with a synthetic seismic source wavelet and a velocity model; 2) backward propagating the seismic data via mathematical modelling using the same velocity model; 3) cross-correlating the seismic wavefield based on the results of forward modeling and backward propagating; and 4) applying an imaging condition during the cross-correlation to generate a seismic image at each time step. The imaging condition may determine how to form an actual image by estimating cross-correlation between the source wavefield with the receiver wavefield under the basic assumption that the source wavefield represents the down-going wave-field and the receiver wave-field the up-going wave-field. In Kirchhoff and beam methods, for example, the imaging condition may include a summation of contributions resulting from the input data traces after the traces have been spread along portions of various isochrones (e.g., using principles of constructive and destructive interference to form the image).

Keeping with seismic imaging, seismic imaging may be near the end of a seismic data workflow before an analysis by a seismic interpreter. The seismic interpreter may subsequently derive understanding of the subsurface geology from one or more final migrated images. In order to confirm whether a particular seismic data workflow accurately models the subsurface, a normal moveout (NMO) stack may be generated that includes multiple NMO gathers with amplitudes sampled from a common midpoint (CMP). In particular, a NMO correction may be a seismic imaging approximation based on determining reflection travel times. However, NMO-stack results may not indicate an accurate subsurface geology, where the subsurface geology is complex with large heterogeneities in particle velocities or when a seismic survey is not acquired on a horizontal plane. Ocean-Bottom-Node surveys and rough topographic land seismic surveys may be examples where NMO-stack results fail to depict subsurface geologies.

While seismic traces with zero offset are generally illustrated in FIG. 2, seismic traces may be stacked, migrated and/or used to generate an attribute volume derived from the underlying seismic traces. For example, an attribute volume may be a dataset where the seismic volume undergoes one or more processing techniques, such as amplitude-versus-offset (AVO) processing. In AVO processing, seismic data may be classified based on reflected amplitude variations due to the presence of hydrocarbon accumulations in a subsurface formation. With an AVO approach, seismic attributes of a subsurface interface may be determined from the dependence of the detected amplitude of seismic reflections on the angle of incidence of the seismic energy. This AVO processing may determine both a normal incidence coefficient of a seismic reflection, and/or a gradient component of the seismic reflection. Likewise, seismic data may be processed according to a pressure wave's apex. In particular, the apex may serve as a data gather point to sort first break picks for seismic data records or traces into offset bins based on the survey dimensional data (e.g., the x-y locations of the seismic receivers (226) on the earth surface (230)). The bins may include different numbers of traces and/or different coordinate dimensions.

Turning to the seismic interpreter (261), a seismic interpreter (261) may include hardware and/or software with functionality for storing the seismic volume (290), well logs, core sample data, and other data for seismic data processing, well data processing, training operations, and other data processes accordingly. In some embodiments, the seismic interpreter (261) may include a computer system that is similar to the computer (602) described below with regard to FIG. 9 and the accompanying description. While a seismic interpreter may refer to one or more computer systems that are used for performing seismic data processing, the seismic interpreter may also refer to a human analyst performing seismic data processing in connection with a computer. While the seismic interpreter (261) is shown at a seismic surveying site, in some embodiments, the seismic interpreter (261) may be remote from a seismic surveying site.

Keeping with the seismic interpreter (261), seismic interpreter (261) may include hardware and/or software with functionality for performing one or more simulations using one or more components (e.g., forward migration operator (271), adjoint migration operator (272), conjugate gradient solver (273), threshold shrinkage function (274)) of a reverse time migration for use in analyzing seismic data and one or more subsurface formations. For example, seismic interpreter (261) may use seismic data to generate a property model of interest (e.g., a reflectivity model) with a least-squares reverse time migration. The seismic interpreter (261) may iteratively update the property model in an inversion process using a forward migration operator (271) and an adjoint migration operator (272) under the Born approximation. A forward migration operator (271) performs a numerical simulation based on wave equation forward modeling to generate forward wavefields and predicted synthetic data for a property model. An adjoint migration operator (272) performs a numerical simulation based on wave equation adjoint modeling to generate adjoint wavefields for a property model. The adjoint migration operator may be built through analyzing an explicit matrix formulation of the forward propagation. For example, both forward and adjoint migration operators may be expressed in matrix forms under the Born approximation for acoustic wave equations. Particularly, a time-domain finite-difference (TDFD) scheme may be applied to implement the forward and adjoint migration operators.

Furthermore, a conjugate gradient solver (e.g., conjugate gradient solver (273)) iteratively updates the property model of interest by numerically solving partial differential equations or optimization problems in a least-squares reverse time migration. For example, the conjugate gradient solver may integrate the cross-correlation between source-side wavefield's derivative (e.g., forward wavefields) and receiver-side wavefields (e.g., adjoint wavefields) over time up to the maximum record time to determine the gradient of current residual defined by an objective function. As another example, the conjugate gradient solver may use the gradient of current residual and previous search directions to determine the conjugate gradient which is the search direction of current iteration. In some embodiments, the conjugate gradient algorithm is a direct method to seek the exact numerical solution after a finite number of iterations for particular systems of linear equations whose matrix is positive definite, large and sparse. Likewise, the conjugate gradient algorithm may provide a unique solution for a quadratic function. For example, the conjugate gradient algorithm may be applied to numerically solve partial differential equations or optimization problems in a least-squares reverse time migration. At each iteration, the conjugate gradient algorithm may determine a search direction (e.g., a conjugate gradient) to seek the final solution of the property model which is conjugate to the gradient of current residual defined by an objective function and previous search directions. However, the conjugate gradient algorithm may be unstable with respect to small perturbations in the property model (e.g., random noise, migration artifacts, etc.).

Furthermore, a threshold shrinkage function (e.g., threshold shrinkage function (274)) may include a sign function and a maximum function that are applied to an update of a property model. The threshold shrinkage function may shrink large values (e.g., greater than a threshold of the maximum value of input data) toward zero and set small values (e.g., less than a threshold of the maximum value of input data) to zero. Thus, the threshold function may remove the small perturbations (e.g., random noise, migration artifacts, etc.) in the property model to improve the convergence of the conjugate gradient algorithm. Furthermore, in some embodiments, the seismic interpreter (261) may apply one or more threshold shrinkage functions based on an L1 norm constraint (e.g., see the accompanying description to FIG. 3) to satisfy a predetermined objective function or other predetermined criteria.

In some embodiments, a seismic interpreter determines the forward wavefields and/or adjoint wavefields using a forward migration operator and/or an adjoint migration operator in order to update a property model. For example, a property model may correspond to a model that describes property values such as anisotropy, attenuation, density, P-wave velocity, and/or S-wave velocity. Likewise, the complexity of the property model may be associated with the computation cost of updating the property model using the forward wavefields and/or adjoint wavefields. In some embodiments, a seismic interpreter applies one or more modeling algorithms (e.g., a finite-difference modeling algorithm) to determine migration operators based on one-way or two-way wave equations under the Born approximation.

Figure 3:
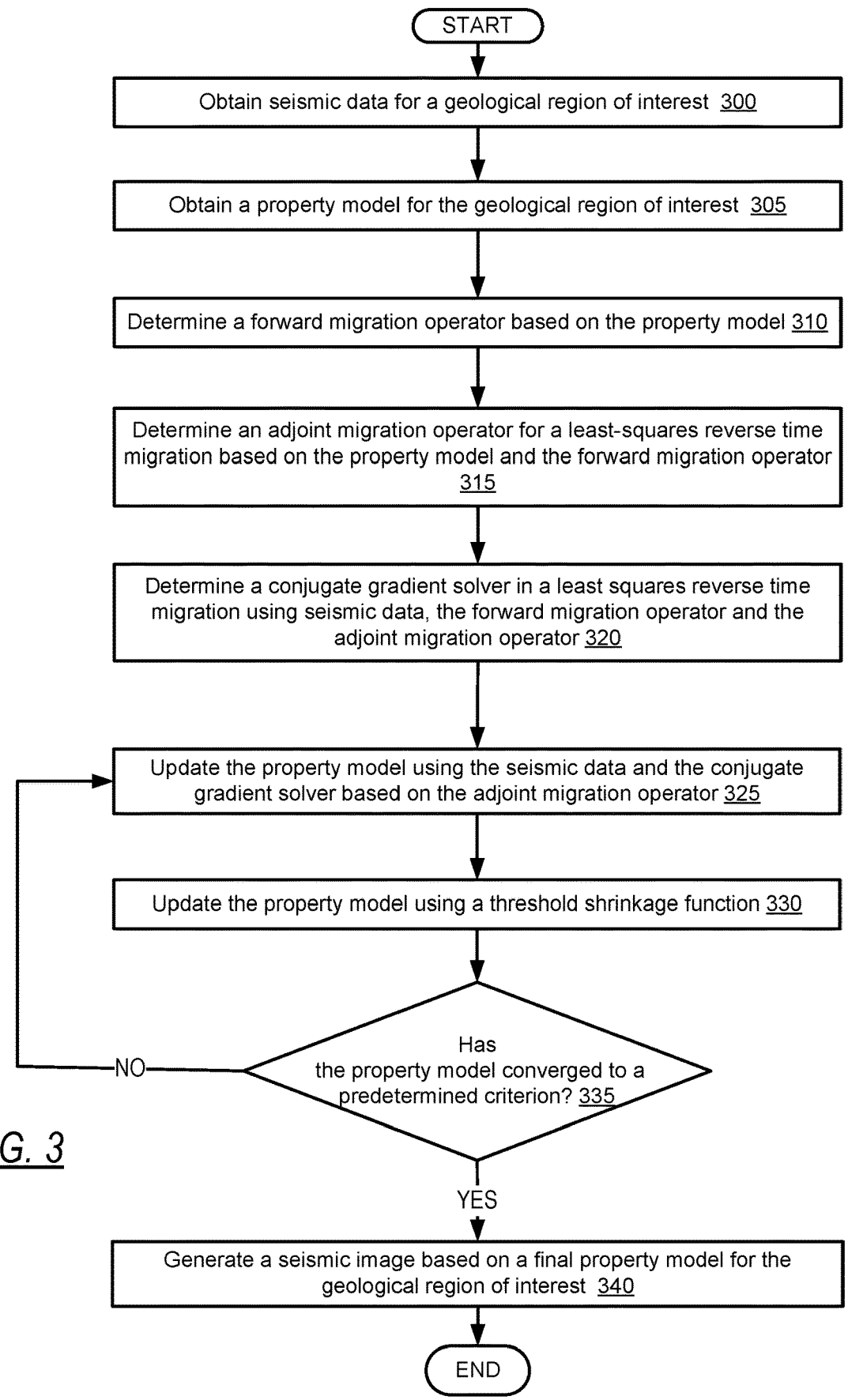
FIG. 3 shows a flowchart in accordance with one or more embodiments.

Turning to FIG. 3, FIG. 3 shows a flowchart in accordance with one or more embodiments. Specifically, FIG. 3 describes a general method for generating seismic images based on a least-squares reverse time migration using a conjugate gradient solver and a threshold shrinkage function. One or more blocks in FIG. 3 may be performed by one or more components (e.g., seismic interpreter (261)) as described in FIGS. 1-2. While the various blocks in FIG. 3 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 300, seismic data are obtained for a geological region of interest in accordance with one or more embodiments. Seismic data may be similar to the seismic data described above in regard to FIGS. 1 and 2. A geological region of interest may be a portion of a geological area or volume desired or selected for further analysis, e.g., for hydrocarbon exploration or enhancing future hydrocarbon production or reservoir development purposes for a respective reservoir.

In Block 305, a property model is obtained for a geological region of interest in accordance with one or more embodiments. The deterministic nature of a least-squares reverse time migration is based on the Born equation (equation 1) which characterizes the linear relationship between model parameters and seismic data. Specifically, the model parameters of an acoustic two-way wave equation (equation 2) may be characterized by P-wave velocity v which consists of a background velocity $v_0$ and a perturbation velocity $\Delta v$ (equation 3). Likewise, the total wavefield $p'$ may be divided into a background wavefield $p^0$ and the scattered wavefield p (equation 4). The background wavefield $p^0$ may be governed by the background velocity $v_0$ (equation 5). Likewise, the scattered wavefield p may be governed by the property model (e.g., a reflectivity model) of interest which includes both background velocity $v_0$ and the perturbation velocity $\Delta v$ (equation 6 and 7).

$$Lm = d \qquad \text{Equation 1}$$

$$\frac{1}{v_0^2}\ddot{p}' = \frac{\partial^2}{\partial x^2} p' + f \qquad \text{Equation 2}$$

$$v = v_0 + \Delta v \qquad \text{Equation 3}$$

$$p' = p^0 + p \qquad \text{Equation 4}$$

$$\frac{1}{v_0^2}\ddot{p}^0 = \frac{\partial^2}{\partial x^2} p^0 + f \qquad \text{Equation 5}$$

$$\frac{1}{v_0^2}\ddot{p} = \frac{\partial^2}{\partial x^2} p + m\ddot{p}^0 \qquad \text{Equation 6}$$

$$m = 2\Delta v/v_0^3 \qquad \text{Equation 7}$$

where m is a vector of model parameters, d is a vector representing obtained seismic data, L is the forward migration operator which computes data d from the model m, v is the P-wave velocity, $v_0$ is the background velocity, $\Delta v$ is the velocity perturbation, $p'$ is the total wavefield, $p^0$ is the background wavefield, p is the scattered wavefield;

$$\frac{\partial^2}{\partial x^2}$$

is the second derivative with respect to x, $\ddot{p}'$ is the second derivative of the total wavefield $p'$ with respect to time, $\ddot{p}^0$ is the second derivative of the background wavefield $p^0$ with respect to time, and $\ddot{p}$ is the second derivative of the scattered wavefield p with respect to time.

In some embodiments, background S-wave velocities are assumed to have no effect on the source-side kinematics in regard to the P-wave velocity model. In some embodiments, the property model is a model for a property of interest to be updated using the least-squares reverse time migration. For example, the property model may describe the reflectivity for P-waves at different regions within a subsurface. Specifically, the initial property model may have a value of "0" at different regions within a subsurface, or the value is a known from previous seismic data processing. As another example, the property model describes the P-wave velocity at different regions within a subsurface. Specifically, the initial property model is a smooth background velocity model, or the model is a known from previous seismic data processing. The least-squares reverse time migration iteratively may update the property model using an adjoint migration operator to add short-wavelength components to the property model to achieve a high resolution velocity model in the velocity model building process.

In Block 310, a forward migration operator is determined based on a property model in accordance with one or more embodiments. The forward migration operator generates forward wavefields and synthetic seismic data based on the property model. The forward migration operator may be formulated in a linear system with a matrix form (equation 1) in which the velocity perturbation is represented as a vector of model parameters in an optimization problem to be iteratively solved by the conjugate gradient solver.

Furthermore, the scattered wavefield p may be discretized in an explicit second order finite-difference scheme (equation 8). Likewise, the Born equation may be approximated through discretization in a matrix format in an explicit second order finite-difference scheme. For example, in an explicit second order finite-difference scheme, the Born equation may be formulated in a matrix (equation 9) for a number of time steps $N_t=4$ and a number of spatial points $N_x=5$. Specifically, all the values of $p_i^0$ in the Born equation for a fixed time $t_i$ is a snapshot of the background wavefield at that time (equation 10). The forward migration operator L consists of a multiplication of four matrices, wherein the leftmost row vector in equation 9 consists of four sub-matrices, $S_1, \ldots, S_4$ (equation 11), which sample the wavefield at the receiver location $x_0$ and times $t_i$, i=1, ..., 4. Three square matrices in the middle of equation 9 are the propagation matrices which include the template $$\begin{bmatrix} 0 & I \\ -I & T \end{bmatrix}.$$

The sub-matrix T in equation 12 includes the finite difference coefficients as in equation 8. In some embodiments, absorbing boundary conditions are not applied to the boundary grids at $x_0$ and $x_4$ for simplicity. In practice, boundary conditions usually need different treatment.

$$p_j^{i+1} = 2p_j^i - p_j^{i-1} + \frac{\Delta t^2 v_0^2}{\Delta x^2}(p_{j+1}^i - 2p_j^i + p_{j-1}^i) + \Delta t^2 v_0^2 (m\ddot{p}^0)_j^i \quad \text{Equation 8}$$

where $p_j^i$ is scattered wavefield at location $x_j$ and time $t_i$, $\ddot{p}^0$ is the second derivative of the background wavefield $p^0$ with respect to time, $v_0$ is the background velocity, $\Delta t$ is the time interval in the finite-difference stencil, $\Delta x$ is the space interval in the finite-difference stencil, and m is a vector of model parameters defined by equation 7.

$$Lm = [S_1 \; S_2 \; S_3 \; S_4] \begin{bmatrix} I & 0 & 0 & 0 \\ 0 & I & 0 & 0 \\ 0 & 0 & I & 0 \\ 0 & -I & T & I \end{bmatrix} \quad \text{Equation 9}$$

$$\begin{bmatrix} I & 0 & 0 & 0 \\ 0 & I & 0 & 0 \\ -I & T & I & 0 \\ 0 & 0 & 0 & I \end{bmatrix} \begin{bmatrix} I & 0 & 0 & 0 \\ T & I & 0 & 0 \\ 0 & 0 & I & 0 \\ 0 & 0 & 0 & I \end{bmatrix} \begin{bmatrix} p_0^0 \\ p_1^0 \\ p_2^0 \\ p_3^0 \end{bmatrix} m = d$$

$$p_i^0 = \Delta t^2 v_0^2 \begin{bmatrix} \ddot{p}_i^0(x_0) & 0 & 0 & 0 & 0 \\ 0 & \ddot{p}_i^0(x_1) & 0 & 0 & 0 \\ 0 & 0 & \ddot{p}_i^0(x_2) & 0 & 0 \\ 0 & 0 & 0 & \ddot{p}_i^0(x_3) & 0 \\ 0 & 0 & 0 & 0 & \ddot{p}_i^0(x_4) \end{bmatrix} \quad \text{Equation 10}$$

$$S_1 = \begin{bmatrix} 1 & 0 & 0 & 0 & 0 \\ 0 & 0 & 0 & 0 & 0 \\ 0 & 0 & 0 & 0 & 0 \\ 0 & 0 & 0 & 0 & 0 \end{bmatrix} \ldots, S_4 = \begin{bmatrix} 0 & 0 & 0 & 0 & 0 \\ 0 & 0 & 0 & 0 & 0 \\ 0 & 0 & 0 & 0 & 0 \\ 1 & 0 & 0 & 0 & 0 \end{bmatrix} \quad \text{Equation 11}$$

$$T = \begin{bmatrix} 2(1-\alpha_0) & \alpha_0 & 0 & 0 & 0 \\ \alpha_1 & 2(1-\alpha_1) & \alpha_1 & 0 & 0 \\ 0 & \alpha_2 & 2(1-\alpha_2) & \alpha_2 & 0 \\ 0 & 0 & \alpha_3 & 2(1-\alpha_3) & \alpha_3 \\ 0 & 0 & 0 & \alpha_4 & 2(1-\alpha_4) \end{bmatrix} \quad \text{Equation 12}$$

where m is a vector of model parameters defined by equation 7, d is the seismic scattered data, L is the forward migration operator which computes data d from the model m, the sub-matrices $p_i^0$ (i=0, . . . , 3) are diagonal matrice, $p_i^o(x_j)$ is the background wavefield at location $x_j$ and time $t_i$, (i=0, . . . , 3 and j=0, . . . , 4), the four sub-matrices, $S_1, \ldots, S_4$, sample the wavefield at the receiver location $x_0$ and times $t_i$, i=1, . . . , 4, the sub-matrix I is a unit matrix, and the sub-matrix T includes the finite difference coefficients where $\alpha_i = \Delta t^2 v_0(x_i)^2/\Delta x^2$, i=0, . . . , 4.

In Block 315, an adjoint migration operator is determined for a least-squares reverse time migration based on a property model and a forward migration operator data in accordance with one or more embodiments. For example, the adjoint migration operator may be discretized in a matrix format (equation 13) in an explicit second order finite-difference scheme for a number of time steps $N_t$=4 and a number of spatial points $N_x$=5. The adjoint migration operator L' consists of a multiplication of four matrices, wherein the leftmost row vector in equation 13 is a block matrix $[p_0^0 \; p_1^0 \; p_2^0 \; p_3^0]$ which plays the role of the "source" wavefield at the times $t_i$, i=1, . . . , 4 for the imaging condition. Three square matrices in the middle of equation 13 are the adjoint propagation matrices in which the sub-matrix T' is the transpose of the sub-matrix T which includes the finite difference coefficients as in equation 12. The adjoint migration operator may reuse the forward modeling time-marching process combined with little extra effort to compute the transpose T', which significantly simplifies the implementation of adjoint migration operators. For another example, when the velocity $v_0$ is constant and no absorbing boundary condition is employed, the matrix T is symmetric. In this situation, the forward migration operator is self-adjoint, i.e., L'=L.

$$m_a = L'd = [p_0^0 \; p_1^0 \; p_2^0 \; p_3^0] \begin{bmatrix} I & T' & -I & 0 \\ 0 & I & 0 & 0 \\ 0 & 0 & I & 0 \\ 0 & 0 & 0 & I \end{bmatrix} \quad \text{Equation 13}$$

$$\begin{bmatrix} I & 0 & 0 & 0 \\ 0 & I & T' & -I \\ 0 & 0 & I & 0 \\ 0 & 0 & 0 & I \end{bmatrix} \begin{bmatrix} I & 0 & 0 & 0 \\ 0 & I & 0 & 0 \\ 0 & 0 & I & T' \\ 0 & 0 & 0 & I \end{bmatrix} \begin{bmatrix} S_1' \\ S_2' \\ S_3' \\ S_4' \end{bmatrix} d$$

where $m_a$ is a vector of model parameters derived from the adjoint migration operator, d is the seismic scattered data, L' is the adjoint migration operator which computes the model $m_a$ from data d, the sub-matrices $p_i^0$ (i=0, . . . , 3) are diagonal matrice, the four sub-matrices, $S_1', \ldots, S_4'$, are transpose of the four sub-matrices $S_1, \ldots, S_4$, the sub-matrix I is a unit matrix, and the sub-matrix T' is the transpose of the sub-matrix T.

In Block 320, a conjugate gradient solver is determined in a least-squares reverse time migration using seismic data, the forward migration operator and the adjoint migration operator in accordance with one or more embodiments. For example, at a particular iteration, a conjugate gradient solver may determine the predicted data (e.g., demigrated data for the geological region of interest) obtained using a migration function based on the velocity model and the property model of interest (equation 6). The conjugate gradient solver may determine an update to the property model of interest by minimizing a predetermined objection function (equation 15) based on the seismic data, the forward migration operator and the adjoint migration operator. For example, the conjugate gradient solver may use an L1 norm constraint (also called an "L1 matrix norm"), which may be expressed as Equation 14 below:

$$C(m) = \|Lm - d\|_2^2 \quad \text{Equation 14}$$

$$m_a = (L'L)^{-1} L'd \quad \text{Equation 15}$$

where $m_a$ is a vector of model parameters derived from the adjoint migration operator, d is the seismic scattered data, L is the forward migration operator which computes the data d from the model $m_a$, L' is the adjoint migration operator which computes the model $m_a$ from data d, and C(m) is the predetermined objective function in the least-squares reverse time migration for a property model m of interest.

In Block 325, a property model is updated using seismic data and a conjugate gradient solver based on an adjoint migration operator in accordance with one or more embodiments. For example, an updated property model may be determined by adding the property model update derived from the conjugate gradient solver to the previous property model from previous iteration. The property model update may be determined by a process consisting of 1) a back-propagation and construction of a new conjugate gradient with seismic data and the conjugate gradient solver based on the adjoint migration operator, 2) a line search to derive a step length, and 3) a summation of the conjugate gradient scaled by the derived step length and the property model from last iteration.

In Block 330, a property model is updated using a threshold shrinkage function in accordance with one or more embodiments. For example, the threshold shrinkage function may form a part of a conjugate gradient solver or conjugate gradient solver as used in Block 325. In some embodiments, the threshold shrinkage function includes a sign function and a maximum function to determine a predetermined value. This value may be used to determine a residual value within execution of the conjugate gradient solver. Thus, the threshold shrinkage function may further enhance seismic image resolution while attenuating random noise, migration artifacts and various unwanted signals due to subsurface complexity and seismic acquisition limitation.

In some embodiments, a threshold shrinkage function implements an L1 norm term within an objective function. For example, Equation 16 below may correspond to an objective function that may not be easily solved because $\|m\|_1$ has no derivatives at the origin point. Thus, a threshold shrinkage function may be combined with the conjugate gradient solver to determine the property model update in each iteration. Specifically, the threshold shrinkage function attenuates migration artifacts and weak noise that appear in the property model update in each iteration. In some embodiments, a threshold shrinkage function is expressed in Equation 17 below:

$$C(m) = \|Lm-d\|_2^2 + \lambda \|m\|_1 \qquad \text{Equation 16}$$

$$m = \text{sgn}(m) \cdot \text{Max}(|m| - \lambda |m|_{max}, 0) \qquad \text{Equation 17}$$

where m is a vector of model parameters derived from the adjoint migration operator, d is the seismic scattered data, L is the forward migration operator which computes the data d from the model m, C(m) is an objective function for a property model m, sgn(m) is a sign function with the property model m as an input, Max( ) is a maximum function, and λ is coefficient of the precondition term to balance the data misfit and the L1 norm constrain. When λ is large, the final property model may be more sparse and the data mismatch might be too big. When the coefficient of the precondition term is small, the data mismatch may be more important. For example, a λ=0.001 may be used to make sure the data mismatch is small and also the inversion can converge.

In Block 335, a determination is made whether an updated property model has converged to a predetermined criterion in accordance with one or more embodiments. For example, the predetermined criterion may be an objective function, such as expressed in Equation 16. For example, when a value of the objective function is smaller than a predetermined criterion (e.g., 5% of the initial objective function value), convergence may be determined. As another example, the maximum iteration number reaches a predetermined criterion (e.g., a value of "25"). Where the property model has not converged to a predetermined criterion, the process may proceed to Block 325. Where the property model has converged to a predetermined criterion, the process may proceed to Block 340.

In Block 340, a seismic image is generated based on a final property model for a geological region of interest in accordance with one or more embodiments. For example, the seismic image may be a P-wave image of subsurface reflectivity based on the final property model of interest after one or more iterations. The seismic image may apply one or more post-processing procedure to further enhance image resolution and/or geological structure continuation. Thus, the high resolution seismic image provides a spatial and depth illustration of a subterranean formation for various practical applications, such as predicting hydrocarbon deposits, predicting wellbore paths for geosteering, etc. Thus, the adjoint migration operator, the conjugate gradient solver, and the threshold shrinkage function accelerate the convergence and reduce computational costs. As such, the obtained property model of interest may enhance the seismic image resolution and accurately recover these subsurface images that are usually blurred in the result of other imaging methods.

Figure 4:
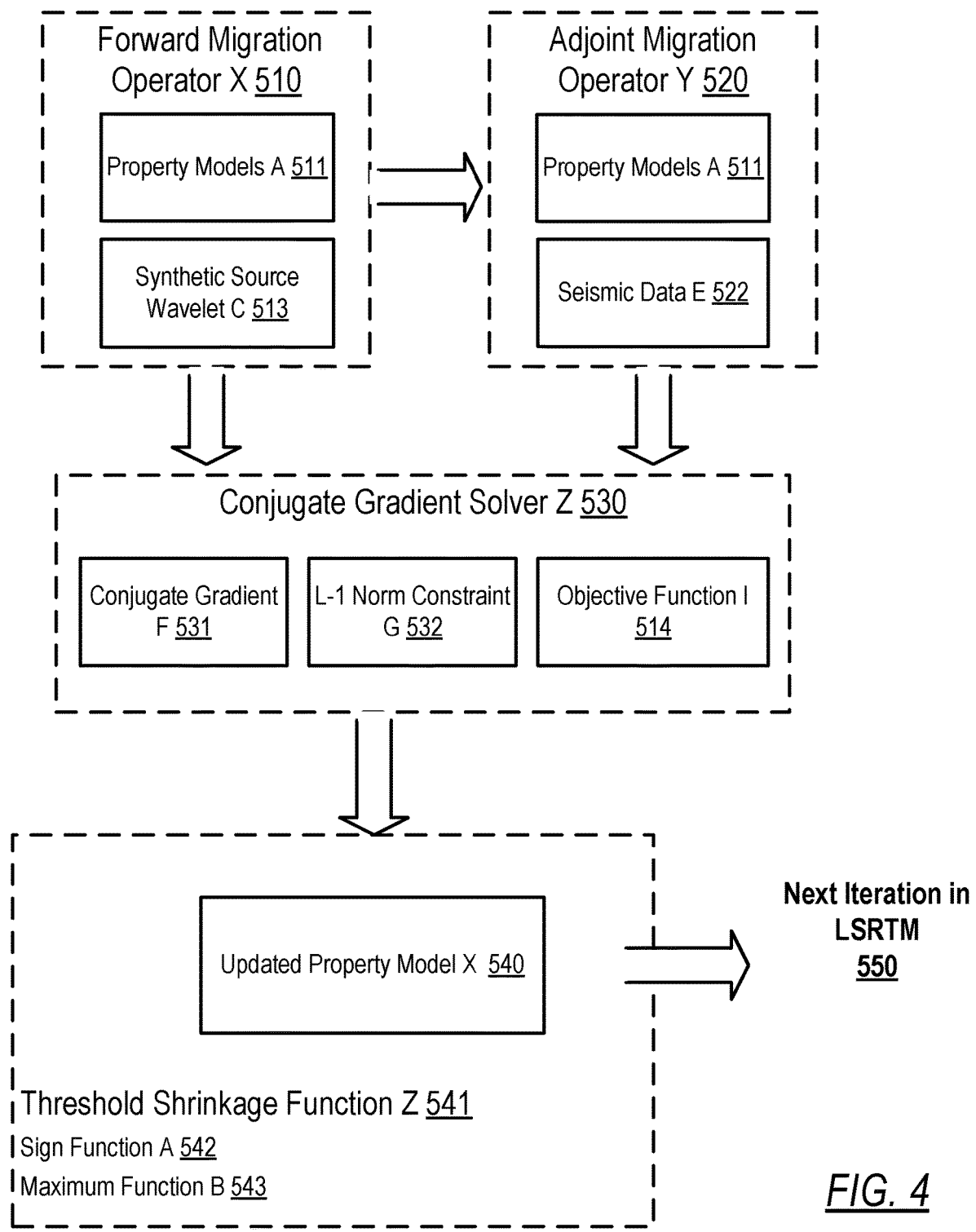
FIG. 4 shows an example in accordance with one or more embodiments.

Turning to FIG. 4, FIG. 4 provides an example of an iteration of a least-squares reverse time migration in accordance with one or more embodiments. As shown in FIG. 4, a least-squares reverse time migration applies forward migration operator X (510), adjoint migration operator Y (520), conjugate gradient solver Z (530), and threshold shrinkage function Z (541) to obtain updated property model X (540). Using property models A (511) and a synthetic source wavelet C (513), a seismic interpreter applies the forward migration operator X (510) to determine forward wavefields and predicted data obtained using a migration function. Likewise, the seismic interpreter applies the adjoint migration operator Y (520) to determine adjoint wavefields using predicted data obtained using a migration function, seismic data E (522), and the property models A (511). The seismic interpreter applies the conjugate gradient solver Z (530) to cross-correlate the forward wavefields and the adjoint wavefields to obtain a conjugate gradient F (531). Specifically, the conjugate gradient solver Z (530) applies an imaging condition and summation during the cross-correlation to generate the conjugate gradient at each iteration of the least-squares reverse time migration. Also, the conjugate gradient solver Z (530) determines the objective function I (514) with a L1 norm constraint G (532) for each iteration which is stored for a history of convergence of the inversion process. Furthermore, the seismic interpreter applies the threshold shrinkage function Z (541) to the updated property model X (540). The threshold shrinkage function Z (541) includes a sign function A (542) and a maximum function B (543) resulting in faster convergence time and improved resolution. The result of the threshold shrinkage function Z (541) is an updated model that is used in next iteration in least-squares reverse time migration (550).

Turning to FIGS. 5A, 5B, 5C, and 5D, a high resolution least-squares reverse time migration is shown imaging multiple diffractors points (501) at various locations in the model. In this example, the background velocity model is laterally invariable, and linearly increasing along the vertical direction. Only 10 shots (i.e., a 500 m interval) are modeled with full receiver coverage at the surface (10 m interval). FIG. 5A shows a ground truth perturbation model which has totally 28 diffractors in four lines. The velocity perturbation values at the diffractors are positive in the first and third lines, and negative in the second and fourth lines. FIG. 5B shows an image of a reverse time migration. The image shows correct sign at the diffractor location but the image resolution is low and blurred by various migration artifacts due to the limited subsurface illumination. FIG. 5C shows an image of a least-squares reverse time migration with no threshold shrinkage function applied. The image shows correct sign at the diffractor location and image resolution is improved than FIG. 5B, while there are still obvious blurring and migration artifacts due to the limited subsurface illumination. FIG. 5D shows an image of a high resolution least-squares reverse time migration with adjoint migration operator and threshold shrinkage function applied, wherein all the diffractors are imaged at the correct locations with minimal blurring and migration artifacts. FIG. 5D also shows the highest resolution among the three images in FIGS. 5B, 5Cs and 5D.

Figure 6A:
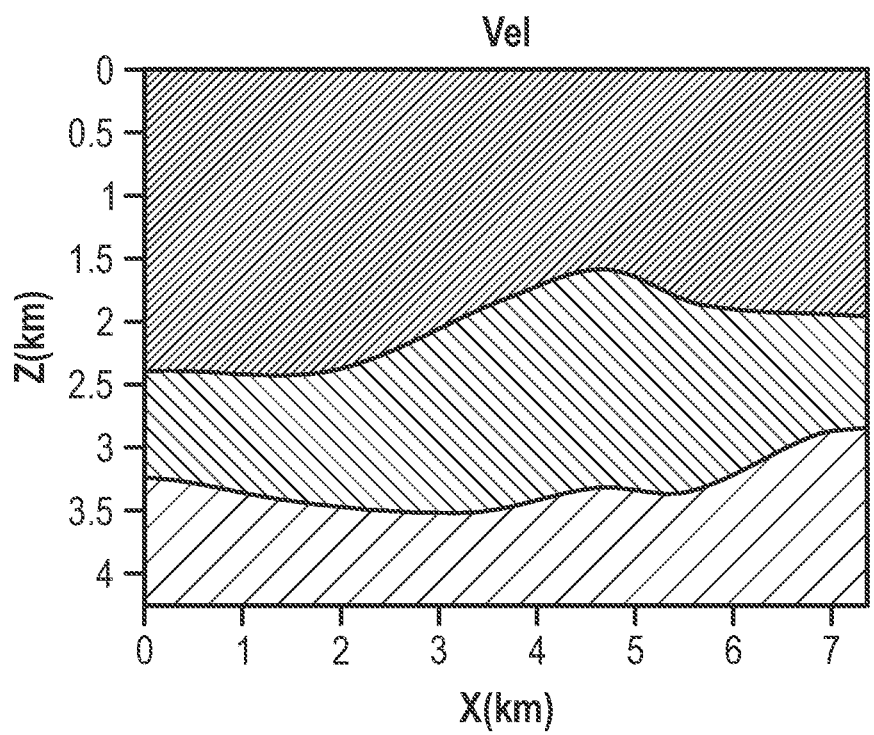
FIGS. 6A and 6B show examples in accordance with one or more embodiments.
Figure 6B:
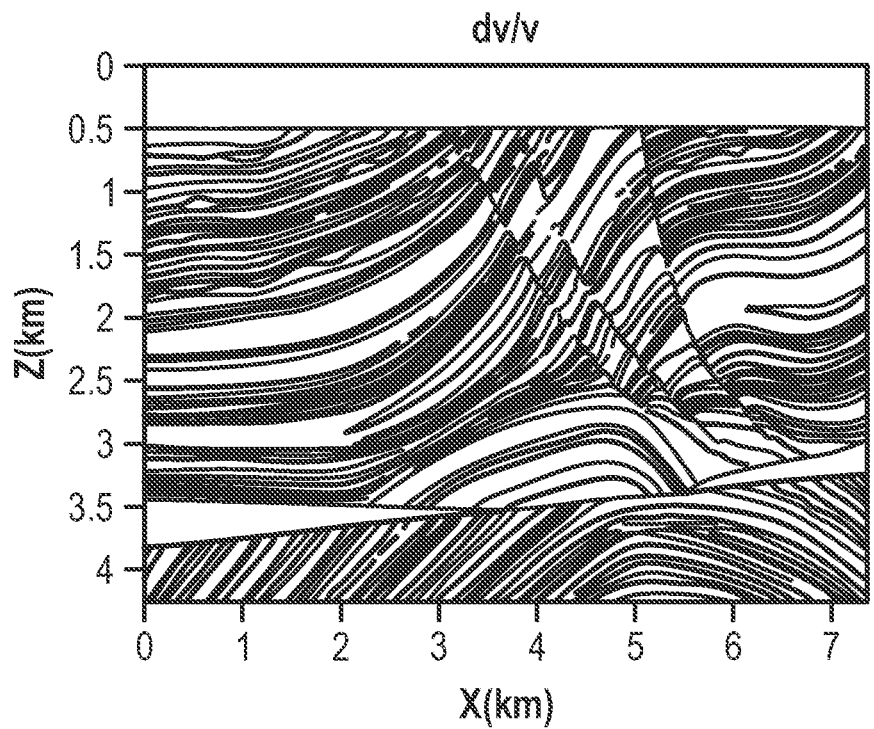

Turning to FIGS. 6A and 6B, a seismic interpreter uses another example to apply a high resolution least-squares reverse time migration for imaging complex geological structure in the model. FIG. 6A shows the background velocity model is both laterally and vertically varied and smooth. FIG. 6B shows the perturbation model used for Born modeling to generate 100 shots at the surface (i.e., 50 m interval) with full receiver coverage at the surface (i.e., 10 m interval).

Figure 7A:
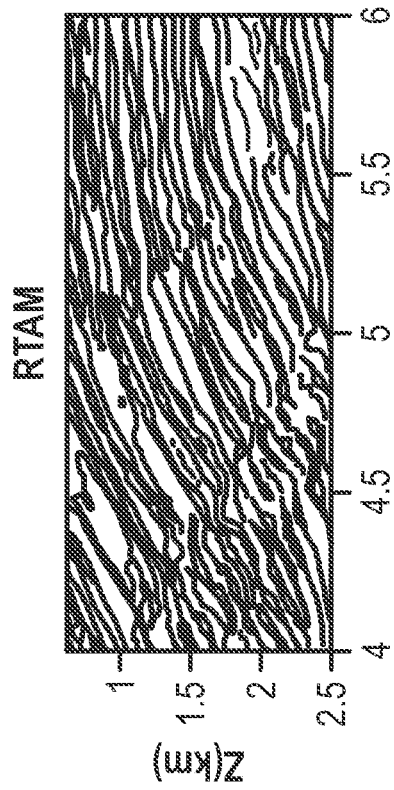
FIGS. 7A, 7B, 7C, and 7D show examples in accordance with one or more embodiments.
Figure 7B:
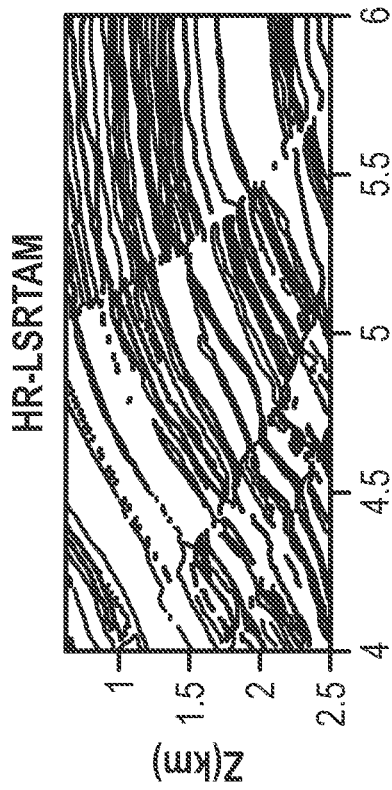
Figure 7C:
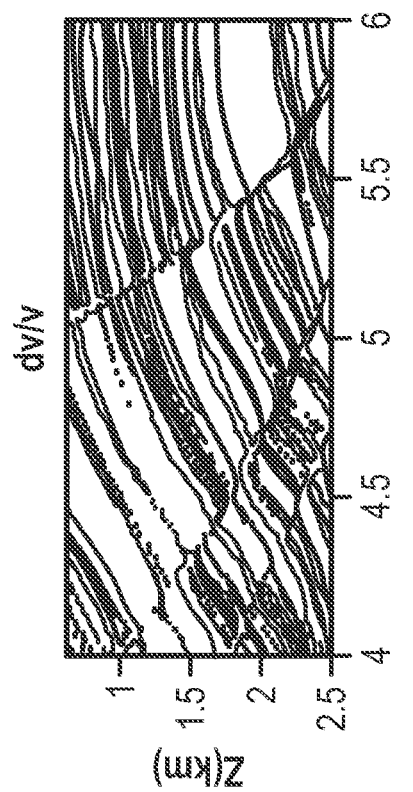
Figure 7D:
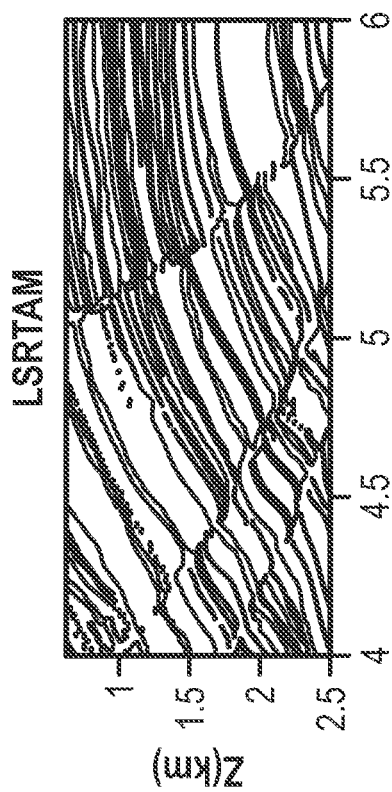
Figure 8:
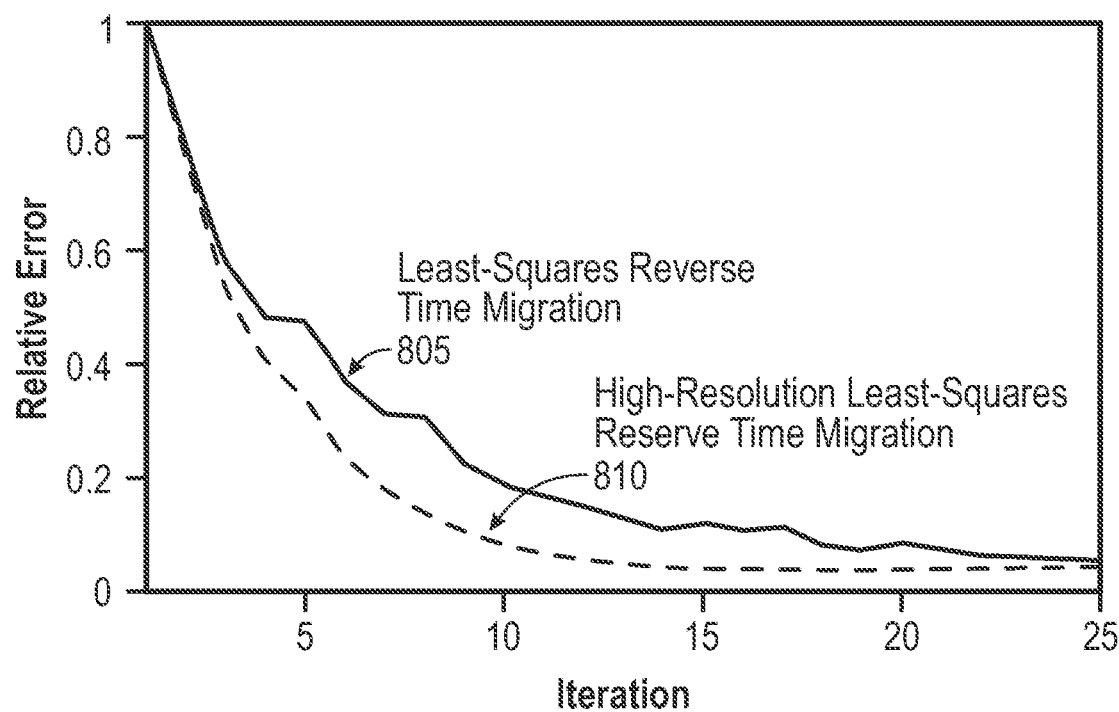
FIG. 8 show an example in accordance with one or more embodiments.

Turning to FIGS. 7A, 7B, 7C, and 7D, FIG. 7A shows a zoomed part of the true reflectivity model for reference. FIG. 7B shows an image of a reverse time migration. The image shows correct sign at the reflection location but the image resolution is low due to the limited subsurface illumination resulted from subsurface complexity. FIG. 7C shows an image of a least-squares reverse time migration with no threshold shrinkage function applied. The image shows correct sign at the reflector location and image resolution is improved than FIG. 7B, while there is still some blurring between the reflection interfaces in the image. FIG. 7D shows an image of a high resolution least-squares reverse time migration with adjoint migration operator and threshold shrinkage function applied, wherein the blurring is reduced and the resolution is the highest among the three images in FIGS. 7B, 7C, and 7D. FIG. 8 shows the high resolution least-squares reverse time migration (810) has a faster convergence rate than the least-squares reverse time migration (805).

Figure 9:
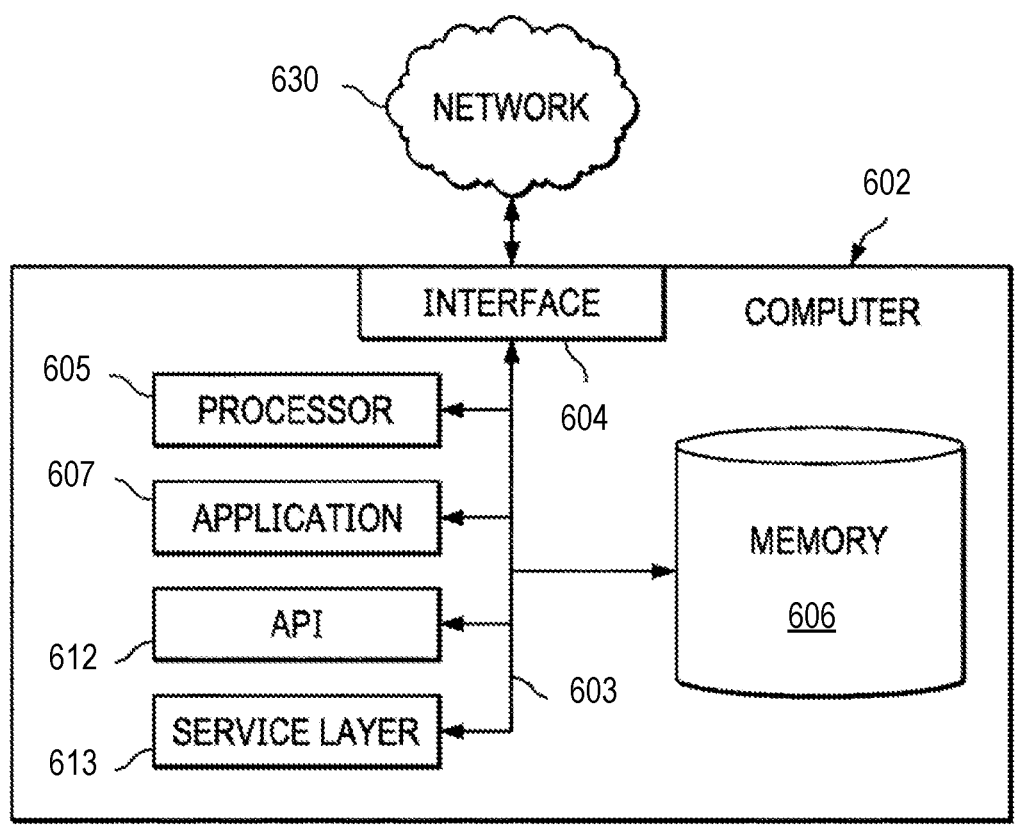
FIG. 9 shows a computing system in accordance with one or more embodiments.

Embodiments may be implemented on a computer system. FIG. 9 is a block diagram of a computer system used to provide computational functionalities associated with described algorithms, methods, functions, processes, flows, and procedures as described in the instant disclosure, according to an implementation. The illustrated computer (602) is intended to encompass any computing device such as a high performance computing (HPC) device, a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (602) may include a computer that includes an input device, such as a keypad, keyboard, touch screen, or other device that can accept user information, and an output device that conveys information associated with the operation of the computer (602), including digital data, visual, or audio information (or a combination of information), or a GUI.

The computer (602) can serve in a role as a client, network component, a server, a database or other persistency, or any other component (or a combination of roles) of a computer system for performing the subject matter described in the instant disclosure. The illustrated computer (602) is communicably coupled with a network (630) or cloud. In some implementations, one or more components of the computer (602) may be configured to operate within environments, including cloud-computing-based, local, global, or other environment (or a combination of environments).

At a high level, the computer (602) is an electronic computing device operable to receive, transmit, process, store, or manage data and information associated with the described subject matter. According to some implementations, the computer (602) may also include or be communicably coupled with an application server, e-mail server, web server, caching server, streaming data server, business intelligence (BI) server, or other server (or a combination of servers).

The computer (602) can receive requests over network (630) or cloud from a client application (for example, executing on another computer (602)) and responding to the received requests by processing the said requests in an appropriate software application. In addition, requests may also be sent to the computer (602) from internal users (for example, from a command console or by other appropriate access method), external or third-parties, other automated applications, as well as any other appropriate entities, individuals, systems, or computers.

Each of the components of the computer (602) can communicate using a system bus (603). In some implementations, any or all of the components of the computer (602), both hardware or software (or a combination of hardware and software), may interface with each other or the interface (604) (or a combination of both) over the system bus (603) using an application programming interface (API) (612) or a service layer (613) (or a combination of the API (612) and service layer (613). The API (612) may include specifications for routines, data structures, and object classes. The API (612) may be either computer-language independent or dependent and refer to a complete interface, a single function, or even a set of APIs. The service layer (613) provides software services to the computer (602) or other components (whether or not illustrated) that are communicably coupled to the computer (602). The functionality of the computer (602) may be accessible for all service consumers using this service layer. Software services, such as those provided by the service layer (613), provide reusable, defined business functionalities through a defined interface. For example, the interface may be software written in JAVA, C++, or other suitable language providing data in extensible markup language (XML) format or other suitable format. While illustrated as an integrated component of the computer (602), alternative implementations may illustrate the API (612) or the service layer (613) as stand-alone components in relation to other components of the computer (602) or other components (whether or not illustrated) that are communicably coupled to the computer (602). Moreover, any or all parts of the API (612) or the service layer (613) may be implemented as child or sub-modules of another software module, enterprise application, or hardware module without departing from the scope of this disclosure.

The computer (602) includes an interface (604). Although illustrated as a single interface (604) in FIG. 9, two or more interfaces (604) may be used according to particular needs, desires, or particular implementations of the computer (602). The interface (604) is used by the computer (602) for communicating with other systems in a distributed environment that are connected to the network (630). Generally, the interface (604 includes logic encoded in software or hardware (or a combination of software and hardware) and operable to communicate with the network (630) or cloud. More specifically, the interface (604) may include software supporting one or more communication protocols associated with communications such that the network (630) or interface's hardware is operable to communicate physical signals within and outside of the illustrated computer (602).

The computer (602) includes at least one computer processor (605). Although illustrated as a single computer processor (605) in FIG. 9, two or more processors may be used according to particular needs, desires, or particular implementations of the computer (602). Generally, the computer processor (605) executes instructions and manipulates data to perform the operations of the computer (602) and any algorithms, methods, functions, processes, flows, and procedures as described in the instant disclosure.

The computer (602) also includes a memory (606) that holds data for the computer (602) or other components (or a combination of both) that can be connected to the network (630). For example, memory (606) can be a database storing data consistent with this disclosure. Although illustrated as a single memory (606) in FIG. 9, two or more memories may be used according to particular needs, desires, or particular implementations of the computer (602) and the described functionality. While memory (606) is illustrated as an integral component of the computer (602), in alternative implementations, memory (606) can be external to the computer (602).

The application (607) is an algorithmic software engine providing functionality according to particular needs, desires, or particular implementations of the computer (602), particularly with respect to functionality described in this disclosure. For example, application (607) can serve as one or more components, modules, applications, etc. Further, although illustrated as a single application (607), the application (607) may be implemented as multiple applications (607) on the computer (602). In addition, although illustrated as integral to the computer (602), in alternative implementations, the application (607) can be external to the computer (602).

There may be any number of computers (602) associated with, or external to, a computer system containing computer (602), each computer (602) communicating over network (630). Further, the term "client," "user," and other appropriate terminology may be used interchangeably as appropriate without departing from the scope of this disclosure. Moreover, this disclosure contemplates that many users may use one computer (602), or that one user may use multiple computers (602).

In some embodiments, the computer (602) is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, a cloud computing system may operate according to one or more service models, such as infrastructure as a service (IaaS), platform as a service (PaaS), software as a service (SaaS), mobile "backend" as a service (MBaaS), artificial intelligence as a service (AIaaS), serverless computing, and/or function as a service (FaaS).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. A method, comprising:
   obtaining, by a computer processor, seismic data regarding a geological region of interest;
   obtaining, by the computer processor, a property model regarding the geological region of interest;
   determining, by the computer processor, an adjoint migration operator based on the property model and a forward migration operator,
      wherein the adjoint migration operator corresponds to a first matrix form that is symmetric with a second matrix form of the forward migration operator, and
      wherein the adjoint migration operator is based on a Born approximation in a third matrix form for acoustic waves;
   updating, by the computer processor, the property model using the seismic data and a conjugate gradient solver in a least-squares reverse time migration to produce a first updated property model, wherein the conjugate gradient solver is based on the adjoint migration operator;
   updating, by the computer processor, the first updated property model using a threshold shrinkage function to produce a second updated property model, wherein the threshold shrinkage function comprises a sign function and a maximum function that are applied to the first updated property model,
   wherein the conjugate gradient solver determines a residual value based on an output of the threshold shrinkage function, and
   wherein the first updated property model is updated based on the residual value; and
   generating, by the computer processor, a seismic image of the geological region of interest using the second updated property model.

2. The method of claim 1,
   wherein the property model is updated iteratively until an objective function corresponding to a difference between predicted data and acquired data converges to a predetermined criterion.

3. The method of claim 1,
   wherein the threshold shrinkage function is based on an L1 norm constraint.

4. The method of claim 1,
   wherein the adjoint migration operator generates a plurality of adjoint wavefields based on the seismic data, and
   wherein the forward migration operator generates a plurality of forward wavefields based on the seismic data.

5. The method of claim 1, further comprising:
   determining, using the computer processor, a presence of hydrocarbons in the geological region of interest using the seismic image.

6. The method of claim 1, further comprising:
obtaining a velocity model regarding the geological region of interest,
wherein the property model is a reflection model, and
wherein the property model is updated using the velocity model.

7. The method of claim 6, further comprising:
acquiring, using a seismic surveying system, the seismic data regarding the geological region of interest; and
generating the velocity model using the seismic data and a seismic inversion operation.

8. A system, comprising:
a seismic surveying system comprising a seismic source and a plurality of seismic receivers; and
a seismic interpreter comprising a computer processor, wherein the seismic interpreter is coupled to the seismic surveying system, the seismic interpreter comprising functionality for:
obtaining seismic data regarding a geological region of interest;
obtaining a property model regarding the geological region of interest;
determining an adjoint migration operator based on the property model and a forward migration operator,
wherein the adjoint migration operator corresponds to a first matrix form that is symmetric with a second matrix form of the forward migration operator, and
wherein the adjoint migration operator is based on a Born approximation in a third matrix form for acoustic waves;
updating the property model using the seismic data and a conjugate gradient solver in a least-squares reverse time migration to produce a first updated property model, wherein the conjugate gradient solver is based on the adjoint migration operator;
updating the first updated property model using a threshold shrinkage function to produce a second updated property model, wherein the threshold shrinkage function comprises a sign function and a maximum function that are applied to the first updated property model,
wherein the conjugate gradient solver determines a residual value based on an output of the threshold shrinkage function, and
wherein the first updated property model is updated based on the residual value; and
generating a seismic image of the geological region of interest using the second updated property model.

9. The system of claim 8,
wherein the property model is updated iteratively until an objective function corresponding to a difference between predicted data and acquired data converges to a predetermined criterion.

10. The system of claim 8,
wherein the threshold shrinkage function is based on an L1 norm constraint.

11. The system of claim 8,
wherein the adjoint migration operator generates a plurality of adjoint wavefields based on the seismic data, and
wherein the forward migration operator generates a plurality of forward wavefields based on the seismic data.

12. The system of claim 8, wherein the seismic interpreter further comprises functionality for:
determining a presence of hydrocarbons in the geological region of interest using the seismic image.

13. The system of claim 8, wherein the seismic interpreter further comprises functionality for:
obtaining a velocity model regarding the geological region of interest,
wherein the property model is a reflection model, and
wherein the property model is updated using the velocity model.

14. A non-transitory computer readable medium storing instructions executable by a computer processor, the instructions comprising functionality for:
obtaining seismic data regarding a geological region of interest;
obtaining a property model regarding the geological region of interest;
determining an adjoint migration operator based on the property model and a forward migration operator,
wherein the adjoint migration operator corresponds to a first matrix form that is symmetric with a second matrix form of the forward migration operator, and
wherein the adjoint migration operator is based on a Born approximation in a third matrix form for acoustic waves;
updating the property model using the seismic data and a conjugate gradient solver in a least-squares reverse time migration to produce a first updated property model, wherein the conjugate gradient solver is based on the adjoint migration operator;
updating the first updated property model using a threshold shrinkage function to produce a second updated property model, wherein the threshold shrinkage function comprises a sign function and a maximum function that are applied to the first updated property model,
wherein the conjugate gradient solver determines a residual value based on an output of the threshold shrinkage function, and
wherein the first updated property model is updated based on the residual value; and
generating a seismic image of the geological region of interest using the second updated property model.

15. The non-transitory computer readable medium of claim 14, wherein the threshold shrinkage function is based on an L1 norm constraint.

16. The method of claim 1, wherein the forward migration operator is based on the following equation:

$$Lm = [S_1 \ S_2 \ S_3 \ S_4] \begin{bmatrix} I & 0 & 0 & 0 \\ 0 & I & 0 & 0 \\ 0 & 0 & I & 0 \\ 0 & -I & T & I \end{bmatrix} \begin{bmatrix} I & 0 & 0 & 0 \\ 0 & I & 0 & 0 \\ -I & T & I & 0 \\ 0 & 0 & 0 & I \end{bmatrix} \begin{bmatrix} I & 0 & 0 & 0 \\ T & I & 0 & 0 \\ 0 & 0 & I & 0 \\ 0 & 0 & 0 & I \end{bmatrix} \begin{bmatrix} p_0^0 \\ p_1^0 \\ p_2^0 \\ p_3^0 \end{bmatrix} m = d$$

wherein m corresponds to a vector of model parameters based on the property model, L corresponds to the forward migration operator that includes a multiplication of four matrices, $S_1, \ldots, S_4$ corresponds to a plurality of samples of a wavefield at a predetermined receiver location, $p_i^0$ correspond to a plurality of values of a scattered wavefield for a fixed time $t_i$, T corresponds to a sub-matrix comprising a plurality of finite difference coefficients, d corresponds to predicted data that is modeled based on the forward migration operator and the property model, and I corresponds a sub-matrix that is a unit matrix.

17. The method of claim 1, wherein the adjoint migration operator is determined using the following equation:

$$m_a = L'd =$$

$$\begin{bmatrix} p_0^0 & p_1^0 & p_2^0 & p_3^0 \end{bmatrix} \begin{bmatrix} I & T' & -I & 0 \\ 0 & I & 0 & 0 \\ 0 & 0 & I & 0 \\ 0 & 0 & 0 & I \end{bmatrix} \begin{bmatrix} I & 0 & 0 & 0 \\ 0 & I & T' & -I \\ 0 & 0 & I & 0 \\ 0 & 0 & 0 & I \end{bmatrix} \begin{bmatrix} I & 0 & 0 & 0 \\ 0 & I & 0 & 0 \\ 0 & 0 & I & T' \\ 0 & 0 & 0 & I \end{bmatrix} \begin{bmatrix} S_1' \\ S_2' \\ S_3' \\ S_4' \end{bmatrix} d$$

wherein $m_a$ corresponds to a vector of model parameters based on the property model and derived from the adjoint migration operator, L' corresponds to the adjoint migration operator that includes a multiplication of four matrices, $S_1, \ldots, S_4^1$ corresponding to a plurality of samples of a wavefield at a predetermined receiver location, $p_i^0$ corresponds to a plurality of values of a scattered wavefield for a fixed time $t_i$, T corresponds to a sub-matrix comprising a plurality of finite difference coefficients, d corresponds to predicted data that is modeled based on the forward migration operator and the property model, and I corresponds a sub-matrix that is a unit matrix.

18. The method of claim 1, wherein the adjoint migration operator and the forward migration operator are self-adjoint and satisfy the equation L'=L, and wherein L' corresponds to the adjoint migration operator and L corresponds to the forward migration operator.

* * * * *